Patented June 5, 1923.

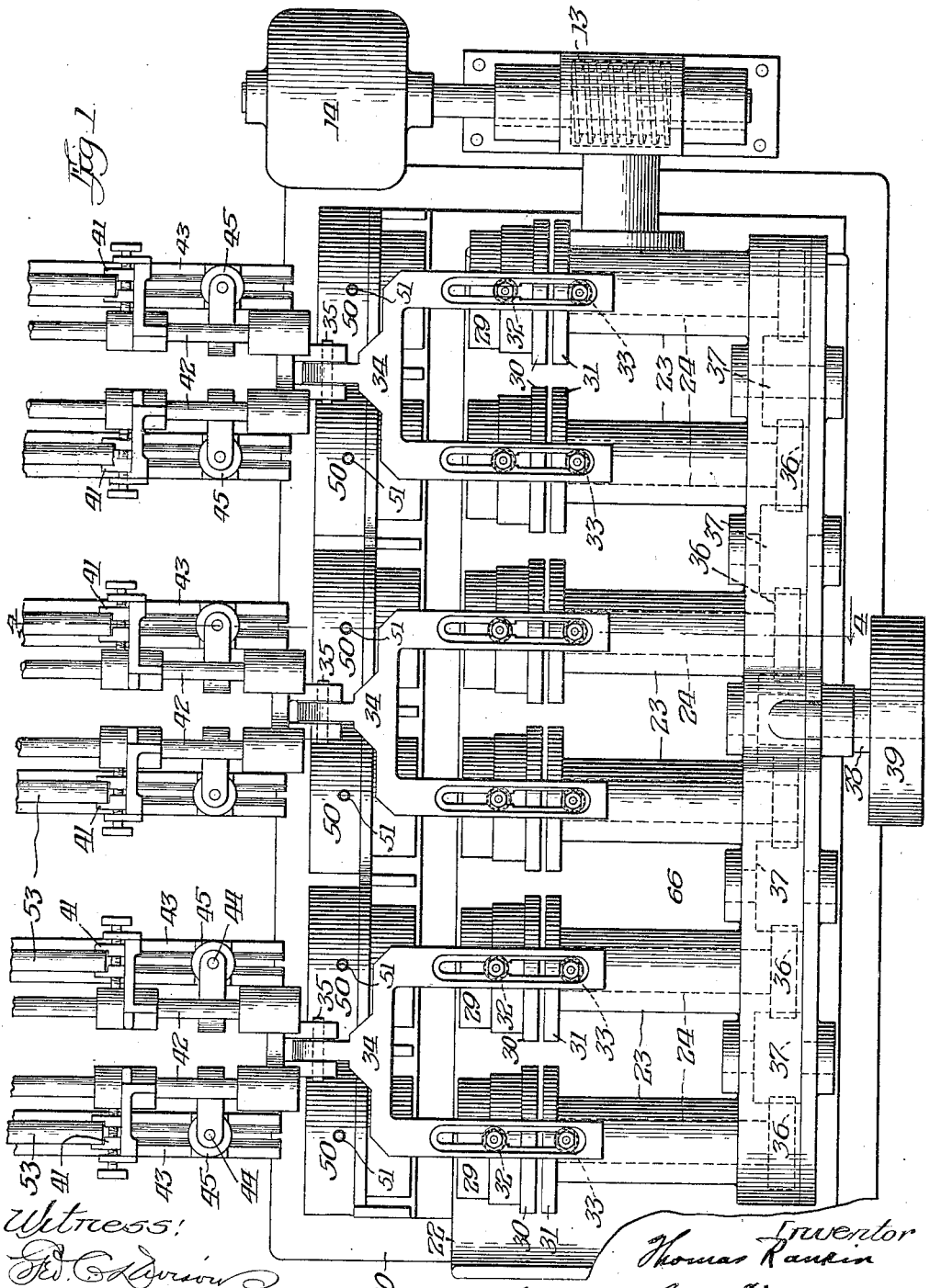

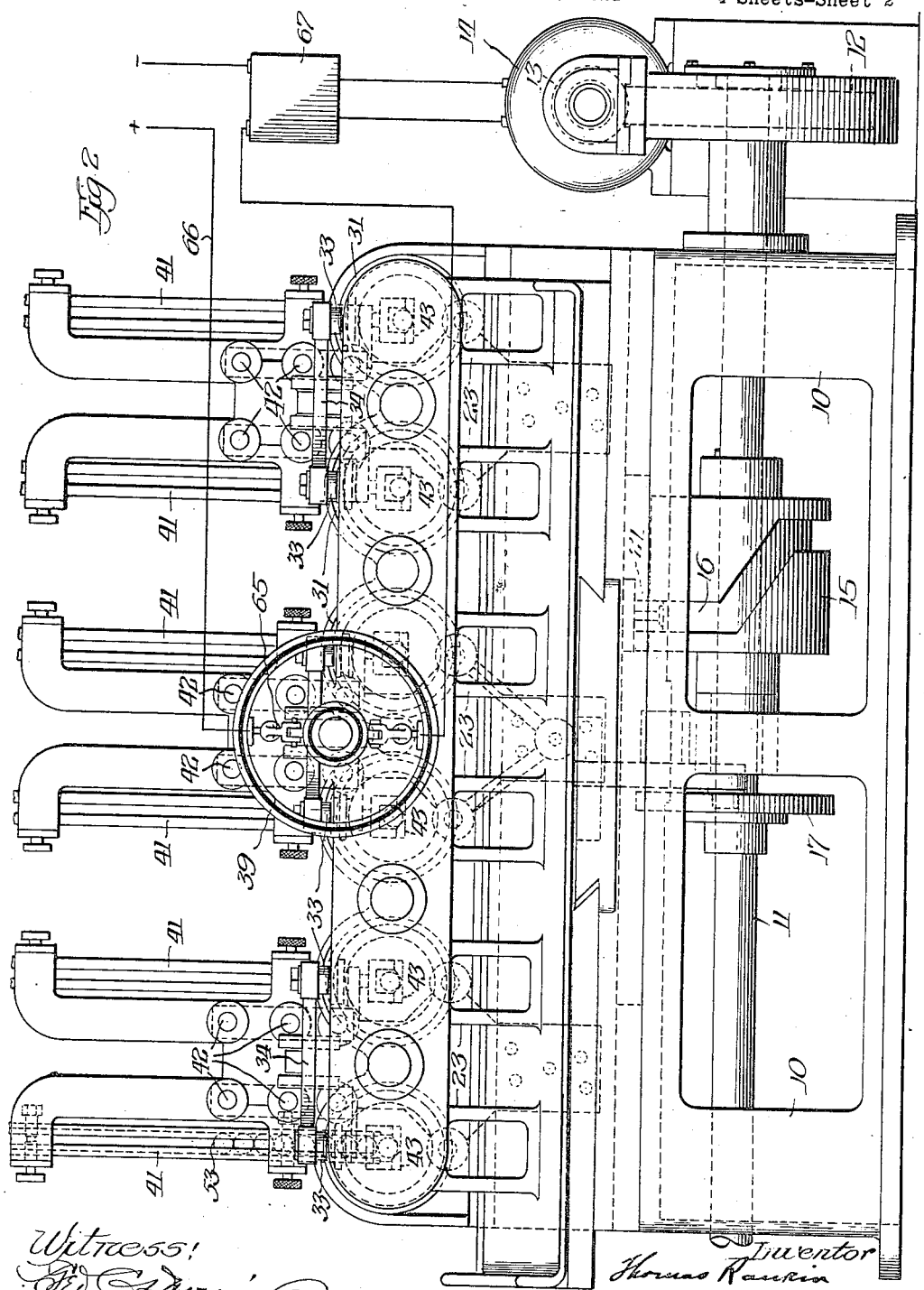

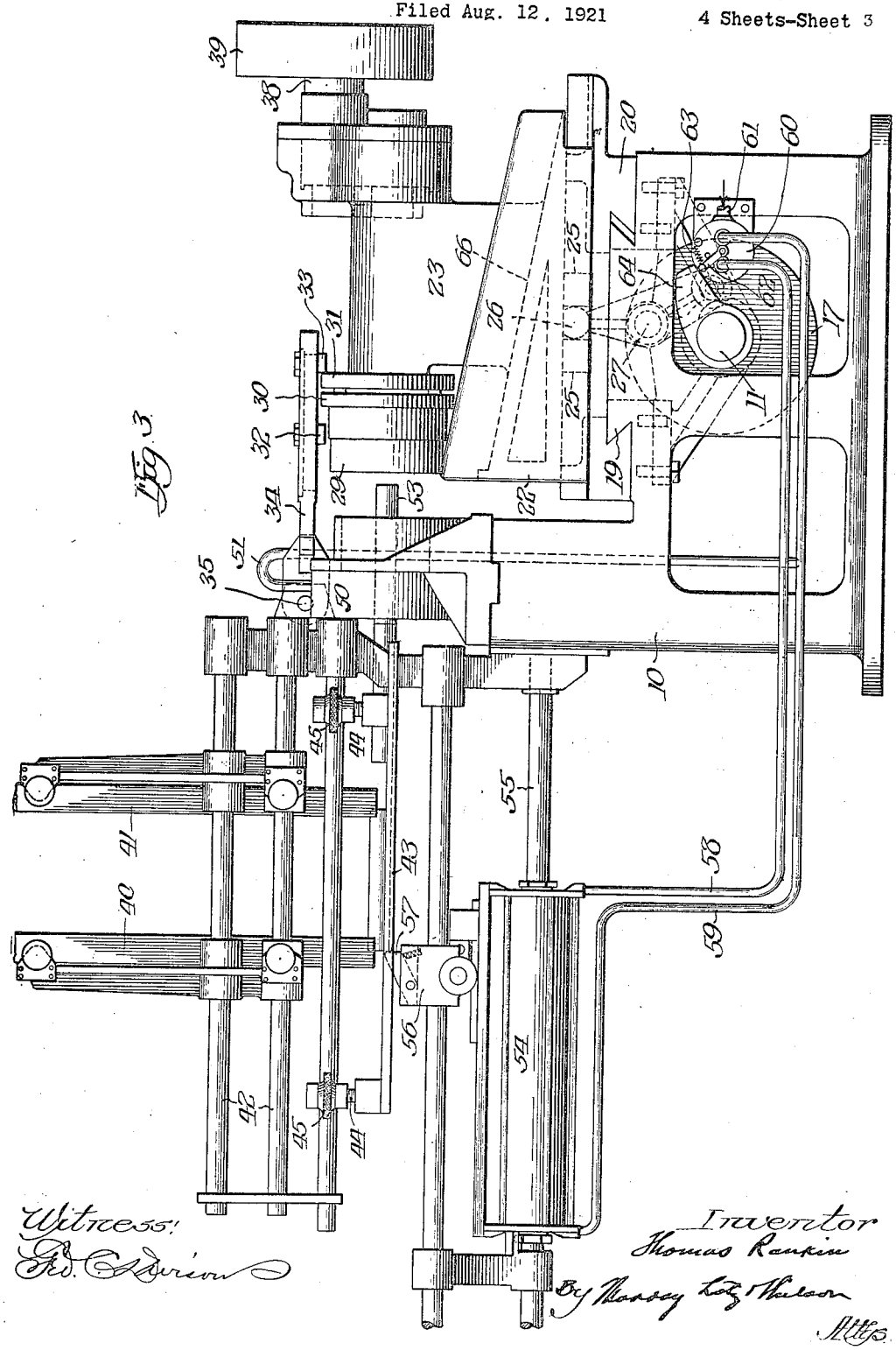

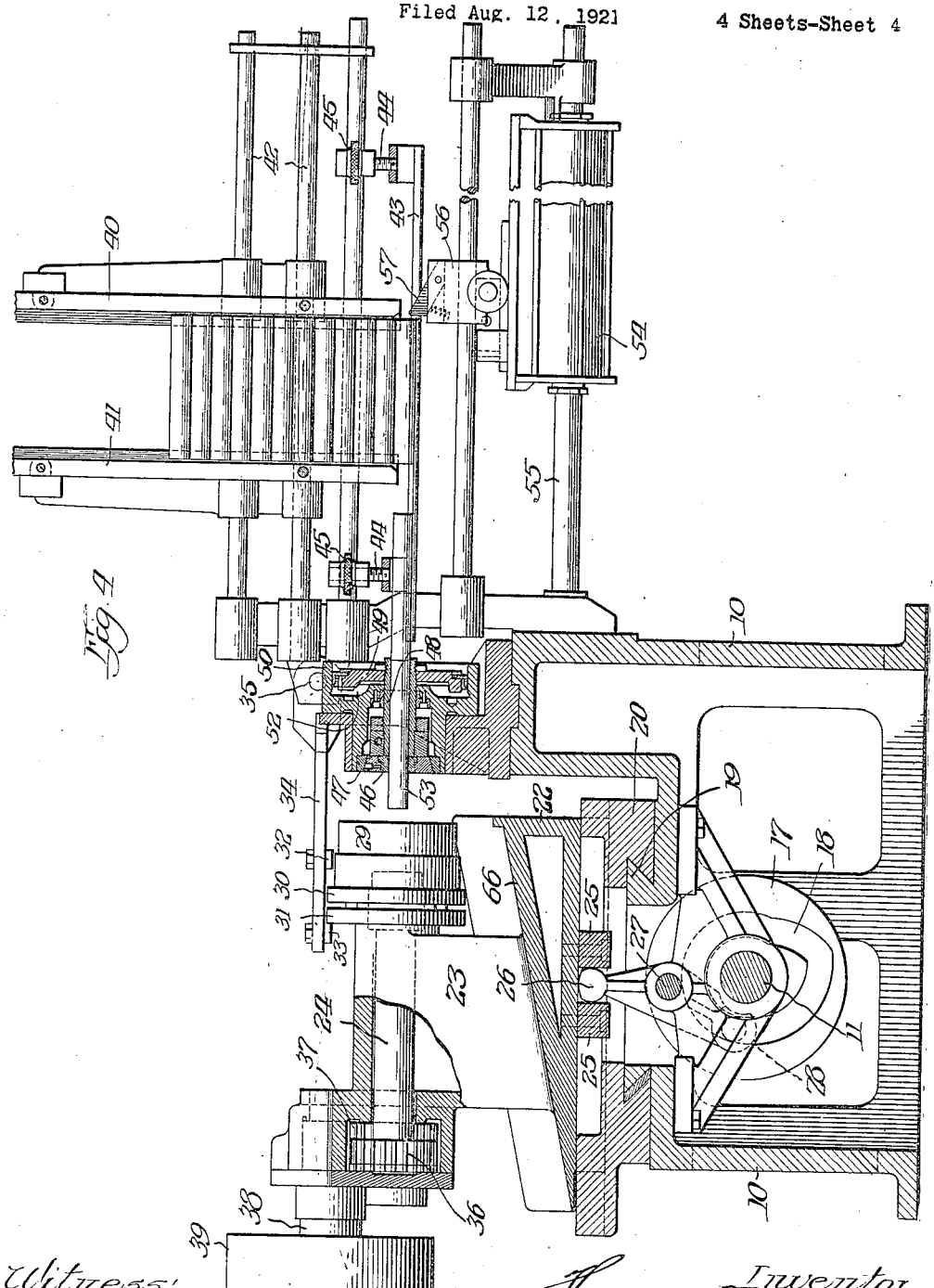

1,457,603

UNITED STATES PATENT OFFICE.

THOMAS RANKIN, OF LAKE BLUFF, ILLINOIS.

NIPPLE-THREADING MACHINE.

Application filed August 12, 1921. Serial No. 491,693.

*To all whom it may concern:*

Be it known that I, THOMAS RANKIN, a citizen of the United States, and resident of Lake Bluff, in the county of Lake and State of Illinois, have invented certain new and useful Improvements in a Nipple-Threading Machine, of which the following is a specification.

My invention relates to threading machinery and particularly to a novel automatic nipple making device.

One of the principal objects of my invention is to improve upon devices for making threaded pipe nipples in such manner as to reduce the cost of operation, eliminate skilled labor and materially increase the speed of production.

In the device of my invention I provide a plurality of threading heads together with automatic means for feeding unthreaded sections of pipe thereto, means being also provided for clamping and discharging the threading sections after the completion of the operation. By the use of the machine of my invention I am able to maintain a relatively large number of threading devices in operation without requiring the attention of more than a single operator. After the machine is started in operation it is only necessary to maintain a supply of blanks in the magazine.

Means are also provided for adjustment of the parts in such manner as to accommodate them to the production of nipples of different lengths and diameters.

The invention will be more readily understood by reference to the accompanying drawings, wherein, Fig. 1 is a plan view of a machine constructed in accordance with my invention;

Fig. 2 is a front elevation thereof;

Fig. 3 is a view taken at the side of the device; and

Fig. 4 is a sectional view taken on the line 4—4 of Fig. 1.

In the drawings it will be seen that I provide a base or frame 10 which carries, in suitable bearings, a main shaft 11, rotated, as best shown in Fig. 2, by means of a worm gear 12 and worm 13, connected to a motor 14, or other source of power. Mounted upon and rotatable with the shaft is a cam 15, having a cam groove 16 on its periphery, and also a cam 17 having a radial groove 18, as best shown in Fig. 4.

Mounted upon the base 10, and co-operating with suitable guides 19, is a slide or table 20 which is provided, as best shown in Fig. 2, with a downwardly projecting roller bearing 21, engaging with the groove 16 of the cam 15. As the cam 15 is rotated the table 20 is reciprocated longitudinally of the shaft 11, for a purpose to be later described.

Superposed upon the table 20 is a second table 22, carrying a plurality of turrets 23, within which shafts 24 are mounted for limited longitudinal movement. The table 22 is provided with guides 25, between which the end 26 of a bell-crank pivoted at 27 is accommodated. The opposite end 28 of the bell-crank engages with the groove 18 of the cam 17, and when the cam is rotated the table 22 with its connected turrets is caused to reciprocate transversely of the main shaft 11.

In the machine shown in the drawings I have provided for six turrets, each containing a shaft 24 to one end of which is secured a threading head 29 of a form adapted to be opened and closed automatically as required. In this instance the head is provided with two annular portions 30, 31, adapted to be contacted by rollers 32, 33, respectively, mounted upon a swinging arm 34, pivoted at 35 to a portion of the frame. In the position shown in Fig. 4, the jaws of the head are in closed position. As the head travels to the right, as viewed in Fig. 4, and the ring 30 contacts the roller 32, the jaws are opened to permit the removal of a piece of threaded work.

At its opposite end each of the shafts 24 is provided with a pinion 36 which engages, as best shown in Figs. 1 and 4, with wide-faced idler pinions 37, mounted in suitable bearings in the turret. These idler gears are connected by suitable gearing to a drive shaft 38, having a wide pulley 39 thereon. A relatively narrow belt engages the pulley 39, and as the gang of turrets is reciprocated the belt accommodates itself to the face of the pulley.

The means for feeding and holding the blanks comprises, as best shown in Figs. 3 and 4, a plurality of magazines consisting of vertical guiding members 40, 41, mounted for adjustment toward and away from each other on the slides 42, the adjustment being provided in order to accommodate blanks of different lengths. Mounted below each of the magazines is a curved or V-shaped chute or slide 43, which is supported by means of threaded members 44, having hand nuts 45, by means of which the position of the chute may be adjusted relative to the bottom of the magazine and to the entrance to the chuck. The chuck, as best shown in Fig. 4, comprises jaws 46, the outer surfaces of which are diagonally disposed and engage with a ring 47, having a similarly shaped surface. The jaws are movable with a sleeve 48, rigid with a piston 49, mounted for sliding movement within a cylinder 50. Upon the admission of air through the hose 51, shown in Fig. 3, to the space 52 behind the piston, the parts are moved and the jaws are closed upon a section of pipe such as indicated at 53 in Fig. 4. No means are shown for opening the jaws following the release of the air pressure, the frictional resistance afforded by the drag of the jaws serving to prevent improper positioning of the pipe section under the action of the plunger.

The pipe sections are delivered to the chuck by means of an air-controlled device consisting of a cylinder 54 movable upon a fixed piston rod 55, having a fixed piston, not shown thereon. Secured to the cylinder is a member 56 having a spring-pressed dog or pawl 57 thereon, the pawl in the retracted position of the cylinder, as shown in Fig. 4, lying behind a section of pipe at the lower extremity of the magazine. Air under pressure is admitted to either side of the piston by means of hose sections 58, 59. The hose section 51 is in communication with the section 59, as best shown in Fig. 3, the two hose sections being connected to a two-way valve 60. Air is supplied to the valve through the connection 61. A valve arm 62, held in position by means of a suitable spring 63, is operated by means of an arm 64, fixed to the main shaft 11.

It sometimes happens that one or more of the heads may become clogged or inoperative in which event the machine is slowed up. When this occurs the device should be brought to a stop, and in order to accomplish the desired result I have provided an electrically connected shut-off consisting, as best shown in Fig. 2, of governor arms 65, on the pulley 39. These are connected by suitable contacts in the circuit 66 to the shut-off box 67, of the motor 14. Thus whenever the speed is reduced to any material extent the motor is disconnected.

The operation of the device is as follows, assuming the parts in the position shown in Fig. 4, and with a supply of blanks in the magazine. It being assumed that the heads are rotated, the operation of the main shaft will, by the rotation of the cam 17, cause the turrets carrying the heads to be moved to the right thereby causing the heads to engage with the projecting portions of the blanks 53. As soon as the threading jaws take effect on the pipe, the heads are caused to move at a slightly greater speed than the travel of the turrets, this being permitted by the longitudinal movement of the shafts 24, the pinions 36 sliding on the face of the idlers 37. When the limit of the threading movement has been reached, the ring 30 contacts the roller 32 and the jaws are opened. At this point the cam 17 has begun the retraction of the turrets and the heads are moved rearwardly out of engagement with the threaded portions of the blanks. As soon as the heads are free of the blanks the cam 15 takes effect, and the table 20 is moved laterally carrying all of the turrets with it. Thus the heads are moved out of the line of the threaded sections of pipe. When this has taken place the arm 64 has moved the valve arm 62, admitted air to the cylinder 54, and permitted the escape of the air in the chuck. The admission of air to the cylinder causes movement of the cylinder and consequently the advance of a pipe section from the bottom of the magazine. This serves to displace the threaded section which drops upon the incline 66. Immediately thereafter the air valve is released, thus admitting air to the chuck and to the opposite end of the cylinder, clamping the section of pipe then in the chuck and returning the cylinder to the position of Fig. 4. Continued operation serves to return the heads to a position opposite the pipe sections and a repetition of the operation described.

The limit stops consisting of the arm 34 and the rollers 32, 33, are pivoted in the position shown to enable their ready displacement when it is necessary to replace heads to accommodate different diameters of pipe.

Obviously the exact form and arrangement of parts is not essential in order to effectively accomplish the results here explained and I do not wish to be limited except as indicated in the appended claims.

I claim:

1. In a threading machine, the combination of a plurality of threading heads, means for bodily moving said heads longitudinally into engagement with a pipe to be threaded and laterally out of line with a threaded pipe, and means for automatically feeding and clamping a section of pipe.

2. In a threading machine, the combination of means for feeding successive sections of pipe, means for clamping a section in position to be threaded, a head, and means synchronized with the feeding of the pipe for advancing, retracting and laterally moving said head.

3. In a threading device, the combination of a plurality of threading heads, means for bodily reciprocating said heads in a line parallel with a pipe to be threaded, means for bodily moving said heads laterally out of and into line with said pipe, a magazine for pipe sections, clamping jaws for the section of pipe to be threaded, and means operating with said clamping jaws for advancing a section of pipe and displacing a threaded section.

4. In a nipple making machine, the combination of a plurality of heads, means for bodily moving said heads laterally and longitudinally of a section of pipe, a chuck, means operated by fluid-pressure for actuating said chuck, and means operated by fluid-pressure for successively advancing pipe sections and displacing a threaded section held by said chuck.

5. In a nipple making machine, the combination of a frame, a shaft, a pair of cams on said shaft, a pair of tables mounted on said frame, means operable by one of said cams for moving one table longitudinally of said shaft, means operable by the other cam for moving another table transversely of said shaft, a turret upon one of said tables, a threading head carried on the turret, and means operable by the bodily movement of said head for opening and closing the threading jaws in said head.

6. In a threading machine, the combination of a frame, a table slidable thereon, a second table superposed and slidable on said first table, means for reciprocating said tables at right angles to each other, a turret superposed on said second table, a head carried by said turret, and means permitting independent bodily movement of said head in said turret.

7. In a threading machine, the combination of a frame, a table slidable thereon, a second table superposed and slidable on said first table, means for reciprocating said tables at right angles to each other, a turret superposed on said second table, a head carried by said turret, and means operable by bodily movement of said head for opening and closing the jaws of said head.

8. In a threading machine, the combination of a frame, a table slidable thereon, a second table superposed and slidable on said first table, means for reciprocating said tables at right angles to each other, a turret superposed on said second table, a shaft mounted in said turret with capacity for longitudinal movement, a head mounted on said shaft, and means operable by the bodily movement of the head for opening and closing the jaws of said head.

9. In a threading device, the combination of a frame, a shaft mounted therein, a pair of cams mounted on said shaft, means for clamping a section of pipe to be threaded, a table mounted on said frame and transversely movable relative to said pipe section by means of one of said cams, a second table superposed on said first table and slidable longitudinally of said pipe section by the other of said cams, a head mounted on said second table, means for rotating said head, and means permitting independent, longitudinally bodily movement of said head relative to the table on which it is mounted.

10. In a threading machine, the combination of a plurality of threading heads, means including a shaft for bodily moving said heads longitudinally into and out of engagement with a pipe section and laterally into and out of line with said section, a chuck, a magazine for retaining a supply of pipe sections, fluid-pressure means for actuating said chuck, fluid-pressure means for successively advancing the lowermost pipe section in said magazine, a fluid-pressure valve, and means operable by said shaft for actuating said valve in timed relation with the lateral and longitudinal movement of the threading heads.

11. In a threading machine, the combination of a plurality of threading heads, means including a shaft for bodily moving said heads longitudinally into and out of engagement with a pipe section, a chuck, a magazine for retaining a supply of pipe sections, fluid-pressure means for actuating said chuck, fluid-pressure means for successively advancing the lowermost pipe section in said magazine, a fluid-pressure valve, and means operable by said shaft for actuating said valve in timed relation with the lateral and longitudinal movement of the threading heads.

Signed at Chicago, Illinois, this 26th day of July, 1921.

THOMAS RANKIN.